United States Patent Office 3,463,850
Patented Aug. 26, 1969

3,463,850
ARABINOFURANOSYL 2-THIOPYRIMIDINES AND PHARMACEUTICAL COMPOSITIONS THEREOF
Tsung-Ying Shen, Westfield, and William V. Ruyle, Scotch Plains, N.J., assignors to Merck & Co., Inc., Rahway, N.J., a corporation of New Jersey
No Drawing. Filed Jan. 3, 1967, Ser. No. 606,524
Int. Cl. A61k 27/00; C07d 51/52
U.S. Cl. 424—180                    15 Claims

ABSTRACT OF THE DISCLOSURE 2-thiouracid arabinosides are prepared by treating with hydrogen sulfide a 2,2′ - anhydro-1-(5′-OR′-β-D-arabinofuranosyl)uracil, where R′ is a protecting group, to afford the corresponding 1-(β-D-arabinofuranosyl)-2-thiouracil. The protecting group is then removed. Acylation and thiation of the 2-thiouracil affords the 2,4-dithiouracil-analog, and subsequent amination yields the corresponding 2-thiocytosine arabinoside. The 2-thiouracil compounds are versatile intermediates useful in the preparation of potent antimetabolites, and are convertible into the 2-thiocytosine compounds having antiviral activity.

Background of the invention

Field of the invention.—This invention relates generally to nucleosides, and more particularly to 2-thiopyrimidine nucleosides. Specifically it relates to novel 1-(β-D-arabinofuranosyl)-2-thiopyrimidine compounds, methods of preparing these compounds and pharmaceutical compositions containing them.

Description of the prior art.—The 4 - thiopyrimidine nucleosides are readily available from the corresponding 4-oxopyrimidine nucleosides by thiation with phosphorus pentasulfide (J. J. Fox et al., J. Am. Chem. Soc., 81, 178 (1959); I. Wempen, R. Duschinsky, L. Kaplan and J. J. Fox, J. Am. Chem. Soc., 83, 4755 (1961)). In contrast to the 4-thiopyrimidine nucleosides, the synthesis of the 2-thiopyrimidine nucleosides have required multi-step conversions methods. The use of glycosyl amines and glycosylthioureas as starting points for building the 2-thiouracil ring systems have been reported. (G. Shaw, R. N. Warrener, J. Chem. Soc., 1958, 153; G. Shaw, R. N. Warrener, M. H. Maquire and R. K. Ralph, J. Chem. Soc. 1958, 2294; M. Sano, Bull. Chem. Soc. Japan, 10, 308 (1962).) The known routes have not been entirely satisfactory in that the yields were often low. It is therefore desirable to provide new synthesis for preparing the novel nucleosides which can be carried out economically and conveniently from available starting materials.

Summary 2-thiopyrimidine nucleosides are synthesized directly and in good yields by anhydro ring cleavage of 2,2′-anhydropyrimidine nucleosides with hydrogen sulfide. According to this invention a 2,2′-anhydro-1-(β-D-arabinofuranosyl)uracil protected at the 5-position is reacted with hydrogen sulfide to afford the corresponding 1 - (β-D-arabinofuranosyl)-2-thiouracil. Removal of the protecting group, acylation to the 2′,3′,5′-O-triacylate and thiation at the 4-position gives the 1 - (2′,3′,5′-O-acyl-β-D-arabinofuranosyl)-2,4-dithiouracil. These compounds are versatile intermediates useful in the preparation of potent antimetabolites, and are accordingly useful in the study of metalobic and biological systems. They are convertible into 1 - (β - D - arabinofuranosyl)-2-thiocytosine compounds having demonstrated antiviral or antitumor activity.

Description of the preferred embodiments

The novel compounds of the present invention have the following structural formula:

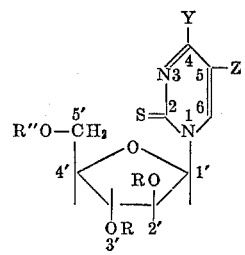

wherein

R is hydrogen, or an acyl radical of the formula $R^2CO$ where $R^2$ is lower alkyl, phenyl or phenyl substituted by groups such as nitro, halo or alkoxy;
R″ is hydrogen, R′, where R′ is acyl or methyl substituted by one or more phenyl or substituted phenyl groups; and acyl where acyl is defined as above;
Y is OH, SH, $NH_2$,

where $R^3$ and $R^4$ are each hydrogen or lower alkyl, or NHOH; and
Z is hydrogen, halogen, lower alkyl, halogenated lower alkyl, or

where $R^3$ and $R^4$ are each hydrogen or lower alkyl.

Typical of the foregoing alkyl groups are methyl, ethyl, propyl, butyl and pentyl. The acyl groups include those derived from alkanoic acids which are exemplified by acetyl, propionyl and butyryl; benzoic acid, and substituted benzoic acids such as p-nitrobenzoyl, p-chlorobenzoyl, p-methoxybenzoyl and the like. Typical among the R′ groups are trityl, benzyl, p-nitrobenzyl and p-chlorobenzyl, and the acyl groups enumerated above. Most preferred is the trityl group. The Z group includes the fluoro, chloro, bromo and iodo, and halogenated lower alkyl groups, particularly the trihalomethyl groups such as trifluoromethyl.

These novel 2-thiopyrimidine nucleosides can be prepared in a general process according to the flow diagram outlined above. In this flow diagram the Y group of Compounds I thru VII are shown in the keto form whereas in Compounds VIII and IX the Y group is shown in the tautomeric enol form. It is understood that the pyrimidine ring of any of these compounds may be present in either tautomeric form, except for Compounds III and X.

FLOW DIAGRAM

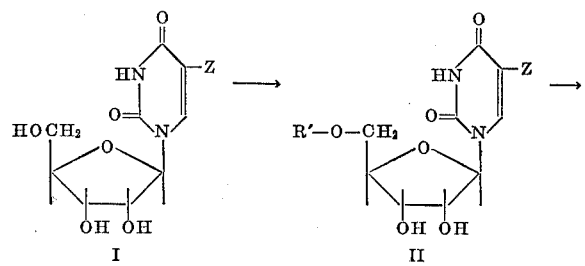

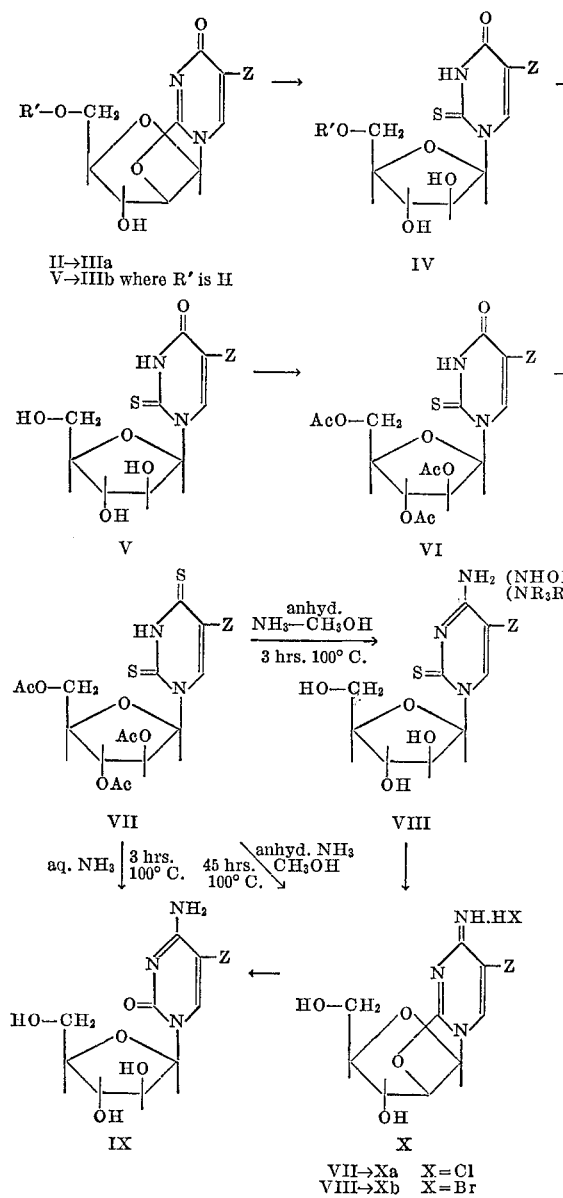

As can be seen from the foregoing flow diagram, the compounds of the present invention are prepared from the appropriate uridine compound (I) suitably protected at the 5′-O-position, as in Compound II. Illustrative of such compounds (II) are: 5′-O-trityluridine, 5′-O-acetyluridine, 5′-O-benzoyluridine, 5′-O-trityl-5-fluorouridine, 5′-O-trityl-5-bromouridine, 5′-O-trityl-5-chlorouridine, 5′-O-trityl-5-trifluoromethyluridine, 5′-O-trityl-5-methyluridine, 5′-O-trityl-5-methylaminouridine, and the like. Preferred among the foregoing compounds are the compounds where R′ is trityl. These compounds can be prepared from uridine, or the corresponding 5-substituted-uridine, by methods known in the art. The 5′-O-trityl-derivatives are conveniently prepared, for example, by heating the corresponding uridine compound (I) with trityl chloride and an organic base such as pyridine on the steam bath for several hours, or by letting the reactants stand at room temperature for several days.

The 1-(5′-OR′-β-D-arabinofuranosyl)uracil (II) is then converted to the corresponding 2,2′-anhydro-derivative (IIIa) by methods known in the art, for example, by treating with a thionocarbonate generating system as is obtained from thiophosgene in the presence of a tertiary amine such as pyridine, triethylamine, N-ethylpyridine, and the like.

It has been discovered that the 2,2′-anhydro-1-(5′-OR′-β-D-arabinofuranosyl)uracil (IIIa) can be reacted with hydrogen sulfide to obtain the 1-(5′-OR′-β-D-arabinofuranosyl)-2-thiouracil (IV). An advantage of this method is that by-products corresponding to the 5′-thio or the 5′,6-epithio structures are not formed in appreciable amounts. The conditions employed in this step are critical in obtaining a high yield of the 2-thiouracil compound. Thus the reaction requires that hydrogen sulfide gas be passed into a solution of the nucleoside in a solvent preferably in the presence of an organic base at an elevated temperature. The hydrogen sulfide is passed into the solution of the nucleoside so as to maintain approximately a saturated solution during the reaction. The preferred operating temperature is in the range of between about 95° and 115° C. Temperatures within the range of 70° to about 130° C. may also be employed. Suitable solvents for this reaction include N,N-di-lower alkanamides, as dimethylformamide, diethylformamide, N,N-dimethylacetamide, N,N-diethylacetamide and the like. The preferred organic base is triethylamine, but other trialkylamines such as tripropylamine, or heterocyclic amines such as N-ethylpiperidine can be employed. The reaction product can be recovered by techniques well known in the art, suitably by extraction with a solvent, drying the extract and then concentrating it under vacuum. The product is purified by chromatography.

The 5′-protecting-group on the 1-(5′-OR′-β-D-arabinofuranosyl)-2-thiouracil (IV) is removed by methods known in the art to afford the corresponding 1-(β-D-arabinofuranosyl)-2-thiouracil (V). The 5′-trityl group, for example, is readily hydrolyzed by warming with 80% acetic acid on the steam bath for a few minutes. The 1-(β-D-arabinofuranosyl)-2-thiouracil (V) is then acylated to give the corresponding 1-(2′,3′,5′-triacyl-β-D-arabinofuranosyl)-2-thiouracil compound (VI). When the 5′-protecting group of Compound IV is acyl it is unnecessary to remove the protecting group before this acylation step. In this case Compound IV is converted directly into Compound VI by acylation.

The 1 - (2′,3′,5′ - O - triacyl - β - D - arabinofuranosyl) 2-thiouracil (VI) is heated with phosphorus pentasulfide in the presence of a solvent to yield the corresponding 1-(2′,3′,5′ - O - triacetyl - β - D - arabinofuranosyl) - 2,4-dithiouracil (VII). An excess of phosphorus pentasulfide (10% or more) is preferred. The reaction temperature ranges from about 75° to 150° C. Suitable solvents are aromatic hydrocarbons such as toluene, or xylene, chlorobenzenes, or a heterocyclic organic base such as pyridine.

The course of the reaction of the 1-(β-D-arabinofuranosyl)-2,4-dithiouracil compound (VII) with ammonia is dependent upon the conditions used. On heating with aqueous ammonium hydroxide at about 90° to 100° C. for about three hours, amination at the 4-position is accompanied by desulfurization at the 2-position, resulting in the corresponding 1-(β-D-arabinofuranosyl)cytosine (IX).

On the other hand, when the 1-(β-D-arabinofuranosyl)-2,4-dithiouracil compound (VII) is heated with anhydrous methanolic ammonia at about 90° to 100° C. for about 3 hours, 1-(β-D-arabinofuranosyl)-2-thiocytosine (VIII) is obtained. However, when the 1-(β-D-arabinofuranosyl)-2,4-dithiouracil (VII) is heated with anhydrous methanolic ammonia at about 90° to 100° C. for 40 to 50 hours, a complex mixture is obtained from which the 2,2′ - anhydro - 1 - (β - D - arabinofuranosyl) - cytosine compound (X) is obtained. This can be recovered by filtering off the solid material, concentrating the filtrate under vacuum, and subliming off the by-product acetamide at reduced pressure. The residue is purified by chromatography and isolated, for example, as the hydrochloride salt. In these reactions other alkanols such as ethanol or isopropanol, and likewise dioxane or tetrahydrofuran, can be employed instead of methanol.

When the 1 - (β - D - arabinofuranosyl) - 2,4 - dithiouracil compound (VII) is heated with a suitable amine, such as a mono- or dialkylamine, for example, methylamine, ethylamine, propylamine, dimethylamine, diethylamine or the like, in place of ammonia, the corresponding 1 - ($\beta$ - D - arabinofuranosyl) - 2 - thio - 4 - alkylamino or dialkylaminopyrimidine is obtained. Refluxing the 1-($\beta$ - D - arabinofuranosyl) - 2,4 - dithiouracil compound (VII) with a solution of hydroxylamine will produce the corresponding 1 - ($\beta$ - D - arabinofuranosyl) - 2 - thio - 4-hydroxy aminopyrimidine.

Unexpectedly, it was discovered that an aqueous solution of the 1-($\beta$-D-arabinofuranosyl)-2-thiouracil (V), or the 1 - ($\beta$ - D - arabinofuranosyl) - 2 - thiocytosine (VIII), is converted into the corresponding 2,2'-anhydro derivative (IIIb) or (X) respectively, by treating with bromine. Conveniently, a solution of bromine is added dropwise to an aqueous solution of the nucleoside at room temperature. When the color persists for as long as 2–3 minutes after the bromine addition, the unreacted bromine is blown off. The product is recovered as a hydrobromide salt by concentration under vacuum. Thus an alternative route has been discovered for preparing the 2,2'-anhydrocompounds (IIIb) and (X), which are intermediates in the preparation of uracil and cytosine compounds useful in the study of metabolic systems.

The 1 - ($\beta$ - D - arabinofuranosyl) - 2 - thiouracil (V) is likewise converted into the 2,2'-anhydro-1-($\beta$-D-arabinofuranosyl)uracil (IIIb) by treatment with iodine in aqueous solution.

In one aspect of the invention it is contemplated to provide compositions containing an effective amount of a 1-($\beta$ - D - arabinofuranosyl) - 2 - thiocytosine compound in a pharmaceutically acceptable vehicle. In general, the type of vehicle employed will depend, in part, upon the mode of treatment selected for treating the infection. Thus, an ointment type of composition may be employed as well as an aqueous solution of the medicament. Where an ointment is involved, the composition comprises, in addition to the 1-($\beta$-D-arabinofuranosyl)-2-thiocytosine compound, a well tolerated base normally used for topical or ophthalmic applications. Suitably there may be employed solid paraffin (white petrolatum) or mixtures of solid paraffin with liquid paraffin (mineral oil) as the bases. When mixtures are employed, suitable weight percent ranges are 10–60% mineral oil and 40–90% solid petrolatum. The actual amount of 2-thiocytosine compound in the mixture should be sufficient to provide an effective amount of the drug to the host in a convenient volume of applied composition. On a weight basis, this may suitably be achieved when the 2-thiocytosine compound comprises from 0.01 to 1.0% of the entire composition.

The 2-thiocytosine compound is a stable, water soluble material and is thus amenable to preparation as a liquid composition. Administration as a liquid is the preferred method of the present invention, and hence liquid compositions are the preferred compositions. For ophthalmic solutions, the present invention encompasses an aqueous solution of 1-($\beta$-D-arabinofuranosyl)-2-thiocytosine, containing sufficient salts to be essentially isotonic and having a pH approximating that of human tears, a value within the range of from 6.5 to 7.5.

As indicated above, with respect to the ointment type of composition, sufficient 2-thiocytosine compound should be present in solution to provide an effective quantity in a convenient volume of applied solution so as to render administration to the host not overly burdensome. Concentrations of about 0.1 mg. to 10.0 mg. per ml. of solution, and preferably from 0.5 mg. to 5.0 mg., are suitable for this purpose. The salts employed may be any commonly used to provide isotonicity such as sodium citrate, sodium borate, sodium chloride, and the like, and preferably sodium chloride, and are suitably present within the range of from 1.0 to 30.0 mg. per ml. and preferably 5 mg. to 15 mg. when sodium chloride is used. The pH of the solution may be adjusted to a value within the above range by adding acid thereto. The acids employed may be typically ophthalmically non-irritating acids at the levels employed such as citric, acetic, boric, phosphoric, lactic, malic, gluconic, hydrochloric, tartaric, sulfuric, and the like, preferably hydrochloric acid, and present in an amount sufficient to adjust the pH within the range of 6.5 to 7.5.

Additionally, the compositions, both liquid and ointment, may also include other ingredients well known in the pharmaceutical art, particularly the topical medicine field, such as stabilizer, antioxidants, preservatives, such as thimerosal, viscosity aids such as methyl cellulose, and the like, as desired. They may then be topically administered to the infected host animal.

The actual absolute amount of medicament supplied to the host will depend on a variety of factors, among which are severity of infection, general health and age of the host, and the like, all well within the domain of those skilled in the art and easily ascertained by them.

The following examples are given for the purpose of illustration only and are not intended to limit the scope of the invention.

Example 1.—5'-O-trityluridine (II)

A mixture of uridine (I, 15 g., 0.062 mole), trityl chloride (18.9 g., 0.968 mole), and dry pyridine (180 ml.), is heated on the steam bath for 2 hours or kept at 25° C. for 72 hours. The reaction mixture is poured into 1 liter of ice-water mixture, and the product is extracted into methylene chloride. The organic layer is washed with cold 2 N sulfuric acid and with water. After drying over magnesium sulfate, the solvent is removed and the 5'-O-trityluridine (II) is crystallized from methanol. Yield 22 g., (73%), M.P. 198–200° C.

When one equivalent amount of p-nitrobenzoylchloride, benzoyl chloride or acetyl chloride is substituted for trityl chloride in the above procedure, the corresponding 5'-O-p-nitrobenzoyl, 5'-O-benzoyl or 5'-O-acetyluridine is obtained.

Additionally, when equivalent amounts of 5-methyl-uridine, 5-methylaminouridine, 5-trifluoromethyluridine, 5-fluorouridine, 5-bromouridine, or 5-iodouridine are used in place of uridine in the above procedure, there is obtained as product the 5-methyl-5'-O-trityluridine, 5-methylamino-5' - O-trityluridine, 5-trifluoromethyl-5'-O-trityluridine, 5-fluoro - 5'-O-trityluridine, 5-bromo-5'-O-trityluridine, 5-iodo-5'-O-trityluridine, respectively.

Example 2.—2,2'-anhydro-1-(5'-O-trityl-$\beta$-D-arabinofuranosyl)uracil (IIIa)

To a solution of 9.8 g. (0.144 mole) of dry imidazole in 83 ml. of dry methylene chloride is added, dropwise, to a solution of 4.12 g. (0.036 mole) of thiophosgene in 34 ml. of benzene. The mixture becomes warm spontaneously, and is stirred without cooling for 2 hours. The precipitated imidazole hydrochloride is filtered, and the solid is washed with 35 ml. of methylene chloride and 160 ml. of toluene. The filtrate is filtered again to remove a slight turbidity, 5'-O-trityluridine (I) (15.9 g., 0.33 mole) is added to the filtrate, and the mixture is heated to distill the methylene chloride and benzene. When the temperature of the distillate reaches 107° C. (in approximately 0.75 hr.) prcipitation of the product appears complete. The mixture is cooled, filtered, and the product washed with cold ethanol. The yield is 14.3 g. (94%), M.P. 200–205° C. This material is sufficiently pure for most synthetic purposes, but may be recrystallized from ethanol to give pure material, M.P. 215–219° C. with very good recovery.

When an equivalent amount of 5'-O-benzoyluridine, 5'-O-acetyluridine, 5-methyl-5' - O - trityluridine, 5-methylamino-5'-O-trityluridine, 5-fluoro-5'-O-trityluridine, 5-bromo-5'-O-trityluridine, or 5-iodo-5'-O-trityluridine is used in place of 5'-O-trityluridine in the above procedure, the corresponding 2,2'-anhydronucleoside is obtained.

Example 3.—1-(5'-O-trityl-β-D-arabinfuranosyl)-2-thiouracil (IV)

A stream of hydrogen sulfide gas is passed into a solution of 8.0 g. (17 millimoles) of 2,2'-anhydro-1-(5'-O-trityl-β-D-arabinofuranosyl)uracil (IIIa) in 75 ml. of dry dimethylformamide and 5.6 ml. of triethylamine while the mixture is heated to 95° C. during a period of 1.5 hrs. Heating is continued while the temperature is raised to 115° C. during 4.5 hrs. After keeping at room temperature overnight, the reaction mixture is poured into 300 ml. of water. The product is extracted twice with 100 ml. portions of ethyl acetate. The addition of saturated sodium chloride solution is helpful in breaking any emulsion that forms. The ethyl acetate solution is washed with water, dried over magnesium sulfate, and concentrated to 9.0 g. of a glassy foam in vacuo. Chromatography on 450 g. of silica gel and elution with 4% methanol in methylene chloride yields 7.8 g. (90%) of an amorphous pale yellow solid in one peak. The product shows a single spot on thin layer chromatography (silica gel, methanol-methylene chloride 1:9).

Similarly the corresponding 2-thiouracil compound is obtained when in place of the 2,2'-anhydro-1-(5'-O-trityl-β-D-arabinofuranosyl)uracil there is employed an equivalent amount of 2,2'-anhydro-1-(5'-O-benzoyl-β-D-arabinofuranosyl)-uracil,
2,2'-anhydro-1-(5'-O-acetyl-β-D-arabinofuranosyl)-uracil,
2,2'-anhydro-1-(5'-O-trityl-5-methyl-β-D-arabinofuranosyl)uracil,
2,2'-anhydro-1-(5'-O-trityl-5-methylamino-β-D-arabinofuranosyl)uracil,
2,2'-anhydro-1-(5'-O-trityl-5-fluoro-β-D-arabinofuranosyl)uracil,
2,2'-anhydro-1-(5'-O-trityl-5-bromo-β-D-arabinofuranosyl)uracil, or
2,2'-anhydro-1-(5'-O-trityl-5-iodo-β-D-arabinofuranosyl)uracil.

Example 4.—1-(β-D-arabinofuranosyl)-2-thiouracil (V)

A mixture of 7.8 g. (15.5 millimoles) of 1-(5'-O-trityl-1-β-D-arabinofuranosyl) - 2 - thiouracil (IV) and 80 ml. of 80% acetic acid is heated on the steam bath for 20 min. The mixture is concentrated to dryness in vacuo and the residue is partitioned between water and ether. Concentration of the aqueous phase yields 4.0 g. of a crystalline solid. Trituration with ethanol gives 3.2 g. (80%) of product, M.P. 199–204° C. Recrystallization from ethanol furnishes an analytical sample, M.P. 203–205° C.

$[\alpha]_{289}^{25} +110°$ (H$_2$O, C1.O), $\lambda_{max.}^{H_2O}$ 276 m$\mu$ ($\epsilon$ 14,700), $\lambda_{min.}^{H_2O}$ 245 m$\mu$ ($\epsilon$ 4,500), $\lambda_{max.}^{0.1\ MNaCH}$ 270 m$\mu$ ($\epsilon$ 14,000), 241 m$\mu$ ($\epsilon$ 21,700), $\lambda_{min.}^{0.1\ MNaCH}$ 262 m$\mu$ ($\epsilon$ 13,600)

*Analysis.*—Calcd. for C$_9$H$_{12}$N$_2$O$_5$S: C, 41.54; H, 4.65; N, 10.77; S, 12.2. Found: C, 41.65; H, 4.64; N, 10.37; S, 12.3.

Similarly the corresponding 1-(β-D-arabinofuranosyl)-2-thiouracil is obtained when in place of the 1-(5'-O-trityl-β-D-arabinofuranosyl(-2-thiouracil there is employed an equivalent amount of 1-(5-methyl-5'-O-trityl-β-D-arabinofuranosyl) - 2 - thiouracil,
1-(5-methylamino-5'-O-trityl-β-D-arabinofuranosyl)-2-thiouracil,
1-(5-fluoro-5'-O-trityl-β-D-arabinofuranosyl)-2-thiouracil,
1-(5-bromo-5'-O-trityl-β-D-arabinofuranosyl)-2-thiouracil, or
1-(5-iodo-5'-O-trityl-β-D-arabinofuranosyl)-2-triouracil.

Example 5.—1-(2',3',5'-O-triacetyl-β-D-arabinofuranosyl)-2-thiouracil (V)

A solution of 2.5 g. (9.6 millimoles) of 1-(β-D-arabinofuranosyl)-2-thiouracil (V) in 4 ml. of pyridine and 20 ml. of acetic anhydride is heated on the steam bath for one hour. The mixture is concentrated in vacuo to an oil, and the concentration is repeated twice after the successive addition of 20 ml. portions of ethanol and toluene. Recrystallization from ethanol yields 3.31 g. (89%) of crystals, M.P. 140.5–141.5° C.

*Analysis.*—Calcd. for C$_{15}$H$_{18}$N$_2$O$_5$S: C, 46.63; H, 4.70; N, 7.25; S, 8.3. Found: C, 46.48; H, 4.63; N, 7.27; S, 8.4.

Similarly the same compound is obtained when in place of the 1-(β-D-arabinofuranosyl)-2-thouracil there is employed as starting material the 1-(5'-acetyl-β-D-arabinofuranosyl)-2-thiouracil. Starting from the 1-(5'-benzoyl-β-D-arabinofuranosyl) - 2 - thiouracil and following the above procedure, the 1 - (2',3' - O - diacetyl - 5' - O - benzoyl - β - D - arabinofuranosyl) - 2 - thiouracil is obtained.

Example 6.—1-(2',3',5'-O-triacetyl-β-D-arabinofuranosyl)-2,4-dithiouracil (VII)

A mixture of 3.2 g. of 1-(2',3',5'-O-triacetyl-β-D-arabinosyl)-2-triouracil (VI), 55 ml. of dry pyridine, and 7.4 g. of phosphorous pentasulfide is heated at reflux for 3.5 hr. The cooled mixture is poured into 300 ml. of water, and after 20 min. of stirring, the solid product is filtered and washed well with water. The moist product is taken up in 25 ml. of pyridine and warmed on the steam bath until the evolution of hydrogen sulfide is complete. The product is again precipitated by the gradual addition of 200 ml. of cold water. After filtering, washing, and drying at 110° C. in vacuo, the crude product weighs 3.26 g. (98%), M.P. 145–7° C. After recrystallization from toluene-hexane, 3.01 g. (91%) of bright yellow crystals are obtained, M.P. 146–7° C.

$\lambda_{max.}^{H_2O}$ 281 m$\mu$ ($\epsilon$ 20,400) inflections at 360, 340, 300 and 198 m$\mu$

*Analysis.*—Calcd. for C$_{15}$H$_{18}$N$_2$O$_7$S: C, 44.78; H, 4.51; S, 15.9. Found: C, 44.68; H, 4.32; S, 15.9.

When an equivalent amount of 1-(2',3',5'-O-triacetyl-5 - methyl - β - D - arabinofuranosyl) - 2 - thiouracil, 1 - (2',3',5' - O - triacetyl - 5 - methylamino - β - D - arabinofuranosyl - 2 - thiouracil, 1 - (2',3',5' - O - triacetyl - 5 - trifluoromethyl - β - D - arabinofuranosyl) - 2 - thiouracil, 1 - (2',3',5' - O - triacetyl - 5 - fluoro - β - D - arabinofuranosyl) - 2 - thiouracil, 1 - (2',3',5' - O - triacetyl - 5 - bromo - β - D - arabinofuranosyl) - 2 - thiouracil, or 1 - (2',3',5' - O - triacetyl - 5 - iodo - β - D-arabinofuranosyl)-2-thiouracil is used in place of the 1 - (2',3',5' - O - triacetyl - β - D - arabinofuranosyl) - 2 - thiouracil in the above procedure, the corresponding 2,4-dithiouracil compound is obtained.

Example 7.—1-(β-D-arabinofuranosyl)-2-thiocytosine (VIII) (2-thiocytosinearabinoside)

A solution of 2.0 g. of 1-(2',3',5'-O-triacetyl-β-D-arabinofuranosyl)-2,4-dithiouracil in 100 ml. of methanol is saturated with anhydrous ammonia at 0° C. The mixture, in a glass liner, is heated in a pressure bomb at 100° C. for three hours. The reaction mixture is concentrated to a gum in vacuo, and most of the by-product acetamide is removed by sublimation at 60° C. 0.1 mm. The residue is chromatographed on 100 g. of silica gel. Elution of the column with methylene chloride-methanol mixtures with methanol concentrations of 2–25% gives fractions containing acetamide and a series of brown gums. The desired product is eluted with 30% methanolmethylene chloride to a total yield of 0.386 g. (30%), M.P. 175–180° C. (dec.) Recrystallization from methanol-isopropanol furnishes an analytical sample, M.P. 180–182° C., dec.

$\lambda_{max.}^{pH-1}$ 278 mµ (ε 17,800), 230 mµ (ε 16,800) $\lambda_{min.}^{pH-1}$ 252 mµ (ε 7,900) $\lambda_{max.}^{pH-13}$ 252.5 mµ (ε 22,900). pKa 3.20 (from UV data)

*Analysis.*—Calcd. for $C_9H_{13}N_3O_4S$: C, 41.70; H, 5.06; N, 16.21; S, 12.3. Found: C, 41.76; H, 4.98; N, 16.49; S, 12.7.

When an equivalent amount of hydroxylamine, methylamine, ethylamine, propylamine, dimethylamine or diethylamine is substituted for ammonia in the above procedure there is obtained the corresponding 1-(β-D-arabinofuranosyl) - 2 - thio - 4 - hydroxyaminopyrimidine, 1 - (β - D - arabinofuranosyl) - 2 - thio - 4 - methylaminopyrimidine, 1 - (β - D - arabinofuranosyl) - 2 - thio - 4 - ethylaminopyrimidine, 1 - (β - D - arabinofuranosyl) - 2 - thio - 4 - propylaminopyrimidine, 1 - (β - D - arabinofuranosyl) - 2 - thio - 4 - dimethylaminopyrimidine, or 1 - (β - D - arabinofuranosyl) - 2 - thio - 4-diethylaminopyrimidine.

When hydroxylamine and diethylamine are used as reactants in place of ammonia the reaction mixture is heated under reflux without using a pressure bomb.

Example 8.—2,2'-anhydro-(1-β-D-arabinofuranosyl) cytosine (Xa)

A solution of 250 mg. of 1-(2',3',5'-O-triacetyl-β-D-arabinofuranosyl) - 2,4 - dithiouracil (VII) in 10 ml. of methanol saturated with ammonia at 0° C. is heated in a bomb at 100° C. for 45 minutes. The dark brown solution is filtered to remove a small amount of black solid. The filtrate is concentrated in vacuo and the acetamide is sublimed at 60° C./0.5 mm. The residue is taken up in ethanol (8 ml.), treated with charcoal, and the filtrate diluted with 10 ml. of ether. Thin layer chromatography shows a multiplicity of components. Upon treatment with excess ethereal HCl and nearly complete evaporation, a crystalline solid is deposited. After recrystallization from methanol-isopropanol, 4.4 mg. of material is collected which showed the properties of 2,2'-anhydro-1-(β-D-arabinofuranosyl)cytosine hydrochloride, M.P. 250–60° C. (dec.).

*Analysis.*—Calc'd. for $C_9H_{12}ClN_3O_4$: C, 41.4; H, 4.6; N, 16.1 Found: C, 41.48; H, 4.49; N, 16.62.

$\lambda_{max.}^{H_2O}$ 231 mµ (ε 8,900), 263 mµ (ε 9,900)

Example 9.—1-β-D-arabinofuranosylcytosine (IX)

A solution of 200 mg. of 1-(2',3',5'-O-triacetyl-β-D-arabinofuranosyl)-2,4-dithiouracil (VII) in 15 ml. of concentrated ammonium hydroxide is heated in a bomb for three hours at 100° C. After removal of the solvent in vacuo, and removal of the acetamide by sublimation at 60° C. and 0.1 mm., the crude amorphous product shows an ultraviolet absorption spectrum typical of a cytosine nucleoside. After the addition of a slight excess of ethanolic hydrogen chloride, and recrystallization from ethanol, 110 mg. (75%) of 1-β-D-arabinofuranosyl cytosine hydrochloride is obtained; M.P. 188–190° C.

Example 10.—(2,2' - anhydro-1-(β-D-arabinofuranosyl) uracil hydrobromide (IIb)

To a solution of 520 mg. (2 millimoles) of 1-(β-D-arabinofuranosyl)-2-thiouracil (V) in 12 ml. of water is added dropwise 3 ml. of a 1 M bromine solution in carbon tetrachloride. At this point the color of the bromine persists for about 2–3 minutes after each addition. The unreacted bromine is blown off with a stream of nitrogen, and the reaction mixture is concentrated to a syrup in vacuo using a bath temperature less than 50° C. The residue is evaporated three times with 10 ml. portions of ethanol, whereupon it crystallizes. The product is triturated with cold ethanol and with ether to obtain 340 mg. of a crystalline hydrobromide salt, M.P. 135–138° C. Recrystallization from methanol-ether gives an analytical sample, M.P. 136–138° C. [Calc'd. for $C_9H_{11}BrN_2O_5$: Br, 26.0. Found: Br, 25.3]. Treatment of a concentrated ethanolic solution of the hydrobromide with a slight excess of ethanolic ammonia yields 2,2'-anhydro-1-(β-D-arabinofuranosyl)uracil (IIIb), M.P. 238–241° C.

When 0.8 equivalent of iodine in near neutral solution is substituted for bromine in the above procedure, unchanged starting material and 2,2'-anhydro-1-(β-D-arabinofuranosyl)uracil (IIIb) are obtained in the ratio of about 2:1.

Example 11.—2,2' - anhydro-1-(β-D-arabinofuranosyl) cytosine (Xb)

Bromination of 80 mg. of (1-β-D-arabinofuranosyl)-2-triocytosine (VIII) in the manner described in Example 10 yields, after recrystallization from ethanol, 17 mg. of 2,2' - anhydro-1-(β-D-arabinofuranosyl)cytosine hydrobromide, M.P. 240° C. dec.

*Analysis.*—Calc'd. for $C_9H_{12}BrN_3O_4$: C, 35.31; H, 3.95; N, 13.71; Br, 26.11. Found: C, 34.55, 34.26; H, 3.57, 3.76; N, 13.40, 13.69; Br, 25.84.

$\lambda_{max.}^{H_2O}$ 264 mµ (ε 9,900), 231 mµ (ε 9,100), $\lambda_{min.}^{H_2O}$ 244 mµ (ε 6,350), $\lambda_{max.}^{pH-13}$ 275 mµ (ε 9,200), $\lambda_{min.}^{pH-13}$ 251 (ε 4,800)]

Example 12

The following is an example showing the preparation of an ophthalmic solution containing 1-(β-D-arabinofuranosyl)-2-thiocytosine. The following ingredients are selected:

| | |
|---|---|
| 1-(β-D-arabinofuranosyl)-2-thiocytosine mg | 100 |
| Sodium chloride mg | 900 |
| Thimerosal (sodium merthiolate) mg | 4 |
| Hydrochloric acid, q.s. pH | 6.8 |
| Water for injection, q.s. to ml | 100 |

The 1 - (β-D-arabinofuranosyl)-2-thiocytosine is dissolved along with sodium chloride and thimerosal in about 80% of the volume of the water. The pH of this solution is then adjusted to about 6.8 with hydrochloric acid. An additional quantity of water is then added so as to adjust the volume to 100 ml. The solution is then sterilized by filtration through a bacteria retentive filter and subdivided aseptically into sterile dropper vials. Sterile dropper fitments are then attached, giving an assembly containing a solution suitable for ophthalmic use and which is sterile, iostonic, preserved, and adjusted to the approximate pH of tears.

Example 13

| | G. |
|---|---|
| 1-(β-D-arabinofuranosyl)-2-thiocytosine | 0.1 |
| White petrolatum | 70.0 |
| Mineral oil | 30.0 |

The white petrolatum is melted and the mineral oil added thereto. The solution is mixed thoroughly and allowed to cool at room temperature. 1-(β-D-arabinofuranosyl)-2-thiocytosine is incorporated by levigation. The composition is then filled into standard ophthalmic ointment tubes and sealed.

Any departure from the above description which conforms to the present invention is intended to be included within the scope of the claims.

We claim:

1. A componnd of the formula:

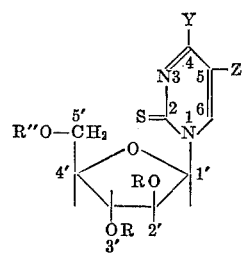

wherein

R is hydrogen, or an acyl radical of the formula R²CO where R² is lower alkyl, phenyl or substituted phenyl groups;

R″ is hydrogen;

R′ where R′ is acyl as defined above or methyl substituted by one or more phenyl or substituted phenyl groups;

Y is OH, SH, NH₂,

where R³ and R⁴ are each hydrogen or lower alkyl, or NHOH; and

Z is hydrogen, halogen, lower alkyl, halogenated lower alkyl, or

where R³ and R⁴ are each hydrogen or lower alkyl.

2. The compound of claim 1 where R and Z are hydrogen, R″ is trityl and Y is OH.

3. The compound of claim 1 where R, R″ and Z are hydrogen and Y is OH.

4. The compound of claim 1 where R and R″ are acetyl, Y is OH and Z is hydrogen.

5. The compound of claim 1 where R and R″ are acetyl, Y is SH and Z is hydrogen.

6. The compound of claim 1 where R, R″ and Z are hydrogen, and Y is NH₂.

7. A process for preparing the compound of claim 1 wherein R is hydrogen, Y is OH, R″ is R′, and R′ and Z are defined as in claim 1 which comprises treating a compound having the formula

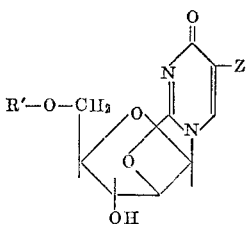

wherein R′ and Z are defined as above, with hydrogen sulfide in a solvent in the presence of an organic base at a temperature within the range of 95–115° C.

8. The process of claim 7 where Z is hydrogen and R′ is trityl.

9. A process for preparing the compound of claim 1 wherein R and R″ are hydrogen, Y is NH, and Z is hydrogen, halogen, lower alkyl, halogenated lower alkyl or

where R³ and R⁴ are each hydrogen or lower alkyl, which comprises heating a compound of the formula:

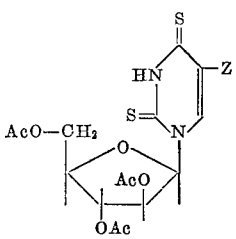

wherein Ac is an acyl radical of the formula R²CO where R² is lower alkyl, phenyl or substituted phenyl, and Z is defined as above, with an anhydrous solution of ammonia in a lower alkanol at about 90° to 100° C. for about 3 hours.

10. The process of claim 9 where Z is hydrogen and Ac is acetyl.

11. A process for preparing a compound of the formula:

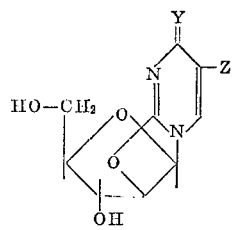

wherein Y is O or NH, and Z is hydrogen, halogen, lower alkyl, halogenated lower alkyl, or

where R³ and R⁴ are each hydrogen or lower alkyl, which comprises treating an aqueous solution of a compound having the following formula where Z is defined as above:

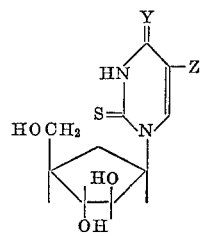

with bromine or iodine when Y is oxygen, or with bromine where Y is NH.

12. The process of claim 11 where Y is oxygen, Z is hydrogen and the reactant is bromine or iodine.

13. The process of claim 11 where Y is NH, Z is hydrogen and the reactant is bromine.

14. A composition comprising about 0.01 to 1.0% by weight of a compound of claim 1 or a pharmaceutically acceptable addition salt thereof, wherein the vehicle is water.

15. A composition comprising about 0.01 to 1.0% by weight of a compound of claim 1 or a pharmaceutically acceptable addition salt thereof, wherein the vehicle is an ointment base of solid or liquid paraffin.

References Cited

UNITED STATES PATENTS 3,116,282  12/1963  Hunter _____ 260—211.5
3,322,747  5/1967  Shen et al. _____ 260—211.5

OTHER REFERENCES

Michaelson: "The Chemistry of Nucleosides and Nucleotides," Academic Press, 1963, New York, N.Y., pp. 75–77.

LEWIS GOTTS, Primary Examiner

J. R. BROWN, Assistant Examiner

U.S. Cl. X.R.

260—211.5